Feb. 21, 1928. 1,659,651
R. L. GREIST
ROAD PAVER
Filed Feb. 7, 1927 3 Sheets-Sheet 3
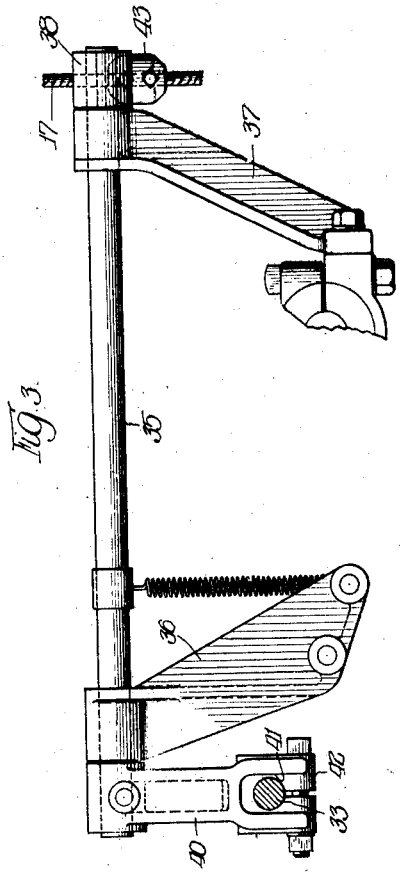
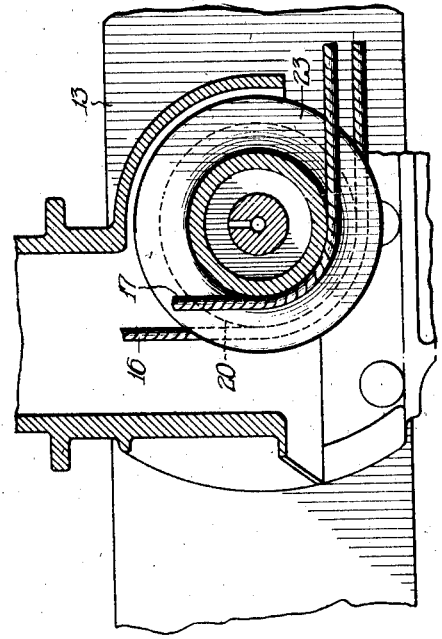
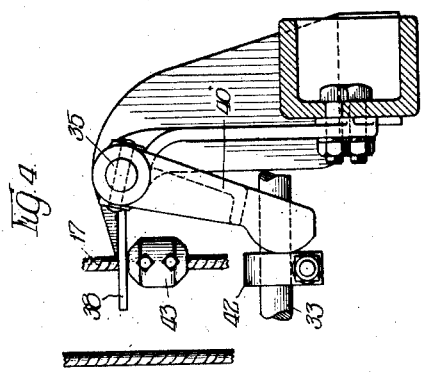
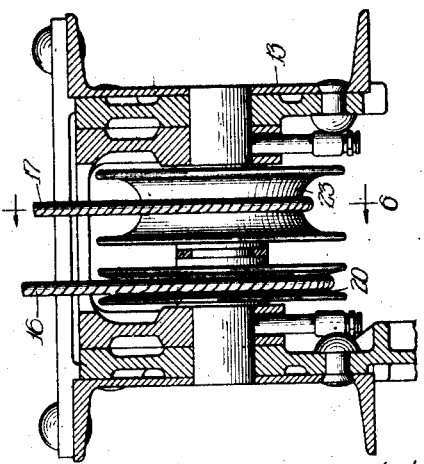
Inventor:
Raymond L. Greist,
By Cromwell, Greist & Warden
attys.
Witness:
R. Burkhardt.

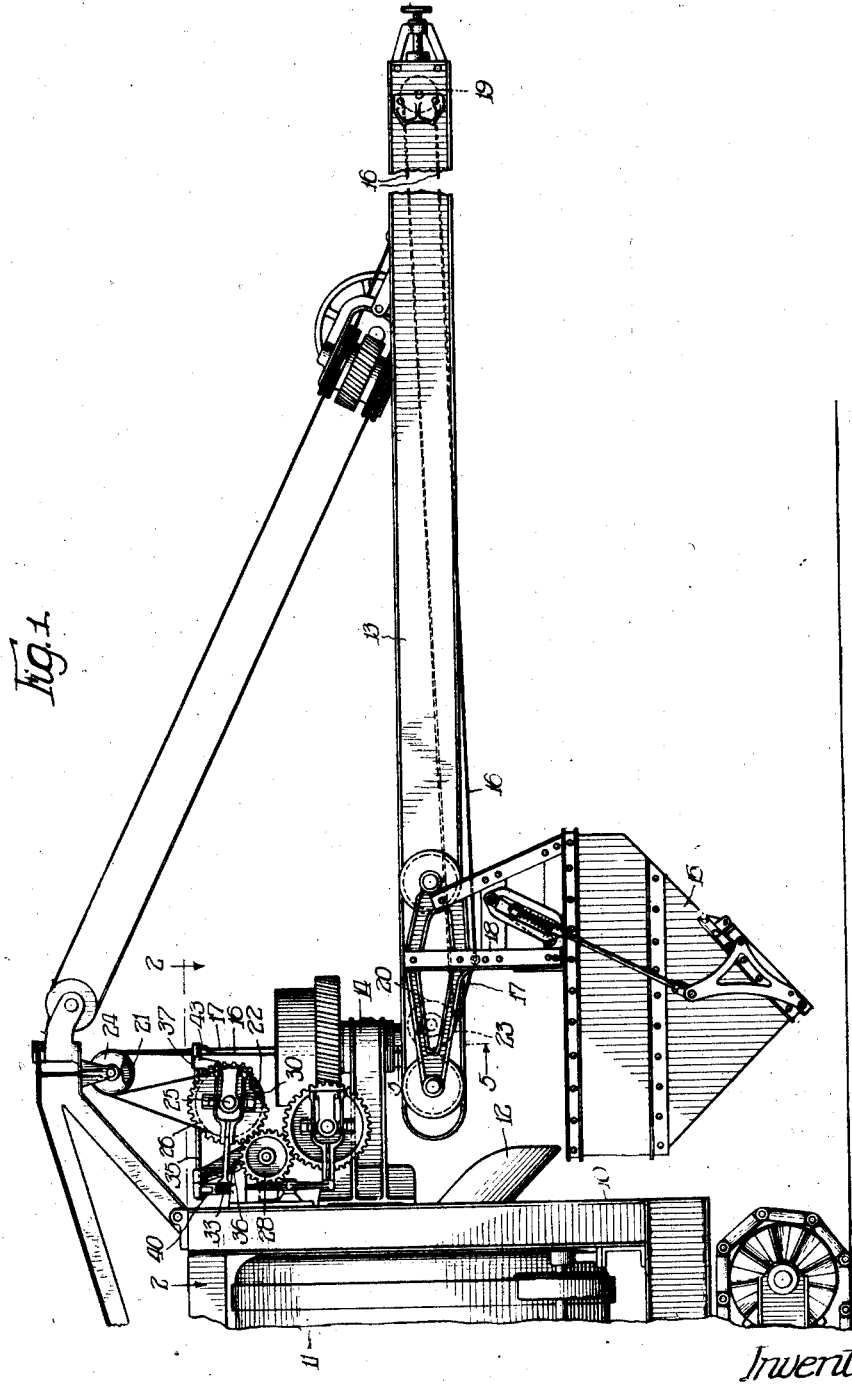

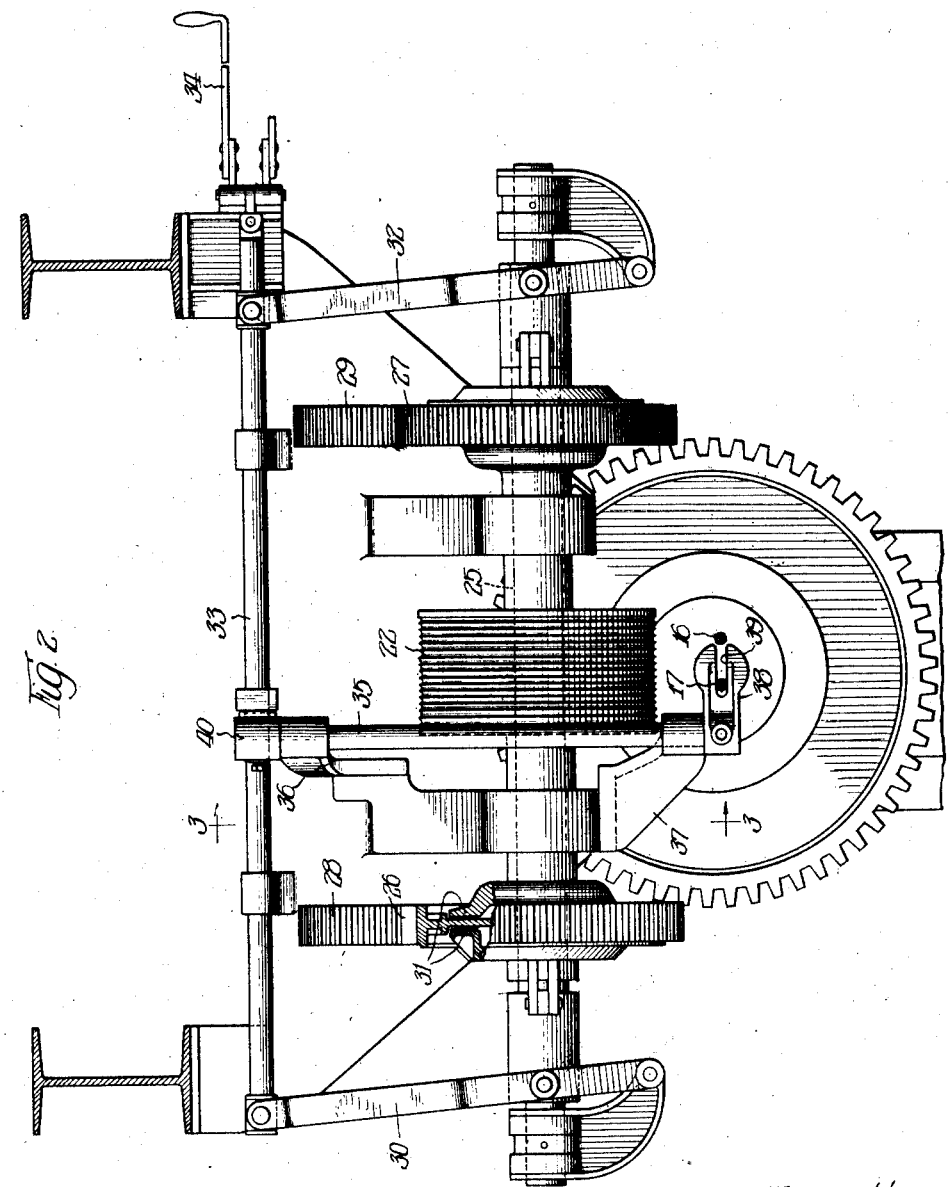

Patented Feb. 21, 1928.

1,659,651

UNITED STATES PATENT OFFICE.

RAYMOND L. GREIST, OF CHICAGO, ILLINOIS, ASSIGNOR TO LEACH COMPANY, OF CHICAGO, ILLINOIS, A CORPORATION OF WISCONSIN.

ROAD PAVER.

Application filed February 7, 1927. Serial No. 166,341.

The present invention has to do with road paving machines of the boom and bucket type, and is particularly concerned with the manner in which the movement of the distributing bucket is controlled.

The principal object of the invention is to provide, in a paver of the type described, improved means for automatically causing the bucket, when moving inwardly along the boom, to stop in a position beneath the delivery chute of the mixing drum.

Other objects and advantages of the invention will be evident to those skilled in the art upon a full understanding of the construction, arrangement and operation of the improved mechanism.

In order that the invention may be readily understood, one embodiment of the same is herein illustrated and described, but it will be appreciated of course that such embodiment is presented merely for the purpose of exemplification and is not intended to restrict the spirit of the invention short of its true scope as defined in the claims.

In the drawings:

Fig. 1 is a side view of a paver equipped with the improved mechanism of the invention;

Fig. 2 is a partially sectioned plan view of the mechanism, as viewed from the line 2—2 of Fig. 1.

Fig. 3 is a side view of the upper portion of the mechanism;

Fig. 4 is an end view of the upper portion of the mechanism;

Fig. 5 is a vertical section through the boom, taken on the line 5—5 of Fig. 1; and Fig. 6 is another vertical section through the boom, taken on the line 6—6 of Fig. 5.

The paver illustrated in the drawings includes a main frame 10, a mixing drum 11 journaled for rotation in the frame, a discharge chute 12 for the drum, a boom 13 pivotally connected near one end to a bracket 14 projecting from the frame, and a distributing bucket 15 supported by the boom and movable lengthwise thereof.

The bucket 15 is pulled outwardly along the boom by a cable 16, and is pulled inwardly along the boom by a cable 17, the two cables being secured in any suitable manner to a carriage 18 from which the bucket is suspended. The cable 16 extends outwardly from the carriage about a sheave 19 which is journaled in the outer end of the boom, then inwardly about a sheave 20 which is journaled in the inner end of the boom, then upwardly about a sheave 21 which is journaled in the upper portion of the frame 10, and then downwardly to a drum 22, about which drum it is wound. The cable 17 extends inwardly from the carriage about a sheave 23 which is journaled in the inner end of the boom at one side of the sheave 20, then upwardly alongside the cable 16 about a sheave 24 which is journaled in the upper portion of the frame 10 at one side of the sheave 21, and then downwardly to the drum 22, about which drum it is wound in a direction opposite to that in which the cable 16 is wound.

The drum 22, which is clearly shown in Fig. 2, is keyed to a shaft 25, and two gears 26 and 27 are journaled on the shaft 25 at opposite sides of the drum. The gear 26 is rotated continuously in one direction by a gear 28 which meshes with the same and is connected with a source of power, and the gear 27 is rotated continuously in the opposite direction by a gear 29 which meshes with the same and is connected with the same source of power as the gear 28 but in such a way as to rotate in the opposite direction.

The gear 26 may be clutched to the shaft 25 by shifting a pivoted yoke 30 toward the gear, which movement causes the gear to be clamped frictionally between two relatively movable clutch elements 31, one of which is connected to the yoke, and the other of which is keyed to the shaft. The gear 27 may be clutched to the shaft 25 in a similar manner by shifting a pivoted yoke 32 toward the gear 27, which yoke is connected with a similar clutch mechanism in association with that gear.

The free ends of the yokes 30 and 32 are pivotally connected to a cross rod 33 which is arranged adjacent the frame 10 in parallel relation to the shaft 25, and the rod 33 may be shifted by a hand lever 34 to operate the two clutch mechanisms in unison. When the rod 33 is in a central or neutral position, both of the gears 26 and 27 will rotate freely relative to the shaft 25 and the drum 22 will be stationary. When the rod is shifted in one direction from the neutral position, as is the case in Fig. 2, the gear 26 will rotate freely relative to the shaft, but the gear 27 will be clutched to the shaft and the drum will rotate in a direction to wind up the cable 17 and move the bucket toward the inner end of the boom. When the rod is shifted in the opposite direction from the neutral position, the gear 27 will rotate freely relative to the shaft but the gear 26 will be clutched to the shaft and the drum will rotate in a direction to wind up the cable 16 and move the bucket toward the outer end of the boom.

The present invention resides in the improved clutch knockout device hereinafter described, which device is so designed as to function properly irrespective of the position to which the boom is swung or tilted relative to the frame of the machine.

A shaft 35 is arranged above the drum 22 at right angles to the rod 33, and is journaled for rocking movement in two brackets 36 and 37. A forked lever 38 extends horizontally from the outer end of the shaft 35 to a point approximately in alignment of the pivotal axis of the boom, and the in-pulling cable 17 travels freely up and down in the slot 39 in the end of the lever. Another forked lever 40 extends downwardly from the inner end of the shaft 35, and the rod 33 which is connected with both of the clutch mechanisms passes through the slot 41 in the end of the lever. A collar 42 is secured to the rod 33 adjacent the lower end of the lever 40, and, when the lever 40 is rocked by a corresponding movement of the lever 38, the lever 40 will bear against the collar 42 and will shift the rod into a position wherein both of the clutch mechanisms associated with the gears 26 and 27 are disconnected.

A contact member 43 is secured to the in-pulling cable 17 at a point thereon where it will reach the forked lever 38 at the time the bucket reaches the end of its inward movement, and, when the bucket does reach that position, the member 43 will ride upwardly into engagement with the slotted end of the lever 38, causing the lever 38 to oscillate, the shaft 35 to rock, and the lever 40 to oscillate and shift both of the clutch mechanisms into neutral positions, thus bringing the bucket automatically to rest in the desired position beneath the discharge chute.

The contact member 43 is shown in the drawings as a rounded lug which is adjustably secured to the cable, but the member obviously may assume any one of many other different forms.

The sheave 23 about which the contact member must travel with the cable 17, is of special construction to accommodate the member, see Figs. 5 and 6, being quite wide between flanges and having a central cable groove.

I claim:

1. In a paver, a boom, a bucket movable along the boom, a cable attached to the bucket, a drum for winding up the cable and causing the bucket to move along the boom, a power source for rotating the drum, a clutch connecting the power source with the drum, and means associated with the cable for operating the clutch and causing the drum to be disconnected from the power source automatically when the bucket reaches a predetermined position on the boom.

2. In a paver, a boom, a bucket movable along the boom, a cable attached to the bucket, a drum for winding up the cable and causing the bucket to move along the boom, a power source for rotating the drum, a clutch connecting the power source with the drum, a lever for operating the clutch, and a contact member secured to the cable for engaging with and shifting the lever whereby to operate the clutch and cause the drum to be disconnected from the power source automatically when the bucket reaches a predetermined position on the boom.

3. In a paver, a boom, a bucket movable along the boom, a cable attached to the bucket, a drum for winding up the cable and causing the bucket to move along the boom, a power source for rotating the drum, a clutch connecting the power source with the drum, a lever for operating the clutch having a forked end through which the cable passes, and a lug secured to the cable for engaging with and shifting the forked end of the lever whereby to operate the clutch and cause the drum to be disconnected from the power source automatically when the bucket reaches a predetermined position on the boom.

In testimony whereof I have hereunto subscribed my name.

RAYMOND L. GREIST.